United States Patent
Bohra et al.

(10) Patent No.: US 11,290,383 B2
(45) Date of Patent: Mar. 29, 2022

(54) OVERLOAD PROTECTION FOR DATA SINKS IN A DISTRIBUTED COMPUTING SYSTEM

(71) Applicant: Akamai Technologies, Inc., Cambridge, MA (US)

(72) Inventors: Aniruddha Bohra, Philadelphia, PA (US); Vadim Grinshpun, Newton, MA (US); Hari Raghunathan, Nashua, NH (US); Mithila Nagendra, Natick, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 67 days.

(21) Appl. No.: 17/008,820

(22) Filed: Sep. 1, 2020

(65) Prior Publication Data

US 2021/0051103 A1 Feb. 18, 2021

Related U.S. Application Data

(63) Continuation of application No. 16/272,286, filed on Feb. 11, 2019, now Pat. No. 10,798,006.

(Continued)

(51) Int. Cl.
*H04L 12/801* (2013.01)
*H04L 47/22* (2022.01)
(Continued)

(52) U.S. Cl.
CPC ............ *H04L 47/22* (2013.01); *H04L 41/142* (2013.01); *H04L 41/145* (2013.01); *H04L 41/147* (2013.01); *H04L 41/16* (2013.01); *H04L 43/045* (2013.01); *H04L 43/062* (2013.01); *H04L 43/067* (2013.01); *H04L 47/20* (2013.01); *H04L 47/25* (2013.01); *H04L 49/503* (2013.01)

(58) Field of Classification Search
None
See application file for complete search history.

(56) References Cited

U.S. PATENT DOCUMENTS 10,237,875 B1 * 3/2019 Romanov ............... H04L 47/32
10,798,006 B2  10/2020 Bohra et al.
(Continued)

OTHER PUBLICATIONS

U.S. Appl. No. 16/272,286, filed Feb. 11, 2019, available in IFW (parent application).

(Continued)

*Primary Examiner* — Ajit Patel

(57) ABSTRACT

Described in this document, among other things, is an overload protection system that can protect data sinks from overload by controlling the volume of data sent to those data sinks in a fine-grained manner. The protection system preferably sits in between edge servers, or other producers of data, and data sinks that will receive some or all of the data. Preferably, each data sink owner defines a policy to control how and when overload protection will be applied. Each policy can include definitions of how to monitor the stream of data for overload and specify one or more conditions upon which throttling actions are necessary. In embodiments, a policy can contain a multi-part specification to identify the class(es) of traffic to monitor to see if the conditions have been triggered.

27 Claims, 14 Drawing Sheets

Related U.S. Application Data

(60) Provisional application No. 62/744,993, filed on Oct. 12, 2018.

(51) Int. Cl.
  *H04L 49/50* (2022.01)
  *H04L 47/25* (2022.01)
  *H04L 47/20* (2022.01)
  *H04L 43/062* (2022.01)
  *H04L 43/045* (2022.01)
  *H04L 41/142* (2022.01)
  *H04L 41/14* (2022.01)
  *H04L 41/147* (2022.01)
  *H04L 41/16* (2022.01)
  *H04L 43/067* (2022.01)

(56) References Cited

U.S. PATENT DOCUMENTS

| | | | |
|---|---|---|---|
| 2015/0081903 A1* | 3/2015 | Molinero Fernandez | H04M 15/66 709/225 |
| 2015/0304281 A1* | 10/2015 | Kasturi | H04L 63/105 726/1 |
| 2017/0091204 A1* | 3/2017 | Minwalla | H04L 43/04 |
| 2018/0351808 A1* | 12/2018 | Das | H04W 24/02 |
| 2020/0120032 A1 | 4/2020 | Bohra et al. | |
| 2020/0153702 A1* | 5/2020 | Larabi | H04L 65/80 |

OTHER PUBLICATIONS

Letter titled "Communication Under MPEP § 609.02" dated Sep. 1, 2020, submitted with this SB08.

* cited by examiner

LLDC → application
    init, process, timeout
application → LLDC
    register_timeout, emit

```
timeout_count = 0
emitted = 0 function process(sidhi, sidlo, buf)
   err = 0
   -- Set a timer to tick every 5 seconds
   if timeout_count == 0 then
      timeout_count = timeout_count + 1
      register_timeout(5)
   end
   if emitted == 0 then
      emitted = 1
      err = emit("ff::LLDC::fe", buf)
   end
   return err
end function timeout(curtime)
   if timeout_count < 5 then
      timeout_count = timeout_count + 1
      register_timeout(5)
   end
   return 0
end
```

*FIG. 7*

OVERLOAD PROTECTION FOR DATA SINKS IN A DISTRIBUTED COMPUTING SYSTEM

This application is based on and is a continuation of U.S. application Ser. No. 16/272,286, filed Feb. 11 2019, which is based on and claims the benefit of priority of U.S. Application No. 62/744,993, filed Oct. 12 2018, the contents of all of which are hereby incorporated by reference in their entirety

BACKGROUND

Technical Field

This document relates generally to protecting systems that consume data produced in large distributed systems, such as content delivery networks.

Brief Description of the Related Art

Large distributed systems produce massive amounts of data. For example, a cloud platform like a content delivery network may have hundreds of thousands of client-facing servers, all producing log data about their client-server interactions. The amount of data will fluctuate with client demand. Back end analytics, storage, and other systems wishing to consume this data (the data sinks) can be easily overwhelmed by spikes in volume. Moreover, the volume and complexity of data reporting is only increasing, with the rapidly increasing array and depth of edge services, which now include security, monitoring, visualisation, analytics, and so on.

It is an objective of the teachings hereof to enhance the ability of network components that consume data generated by a distributed computing system control the amount and nature of reported data that they receive. Such data may be generated as result of edge services being provided to clients, or as a result of large sensor or monitoring network devices. It is an objective hereof to provide an overload protection system that sits in between edge servers and the data sinks and that can shape the reporting traffic destined for each back end system in a highly configurable and proactive way to avoid overloading these data consumer systems (or "data sinks"). The teachings hereof address these and other needs that will become apparent in view of the teachings hereof.

It is known to provide traffic limiting protections such as described in U.S. Pat. No. 7,373,416 and in U.S. patent application Ser. No. 15/682,018 (published as US Patent Publication No. 2019-0042323 A1), the contents of which are hereby incorporated by reference. Those documents address, among other things, the problem of multi-tenancy, e.g., where the CDN delivers content on behalf of many content providers (the tenants). It is useful to have a way to constrain traffic on a tenant by tenant basis, and the teachings hereof can be used in conjunction with the teachings of those documents, but are distinct from them.

BRIEF SUMMARY

In one non-limiting aspect, there is a system including one or more computers having circuitry forming one or more processors and memory storing computer program instructions for execution on the one or more processors to operate the system. The system can include a plurality of source devices generating reporting data, the reporting data comprising a plurality of messages arriving over time, each message having one or more data fields. The source devices can be a plurality of edge servers providing edge services to requesting clients and, in response thereto, generating the reporting data. The sources devices can be IoT devices like sensors, monitors, actuators, and cameras.

The aforementioned system can include a data collection system that receives the reporting data from the source devices, processes that reporting data, and provides processed reporting data to one or more data sinks. In one example, there are at least first and second data sinks. The processing of reporting data can be performed at least in part by: (i) the data collection system receiving first and second policies for first and second data sinks, respectively, the first policy being defined by an owner of the first data sink and the second policy being defined by an owner of the second data sink, and (ii) monitoring reporting data over time to determine that, at a particular time, a first condition in the first policy has been met by the reporting data, and (iii) based on said determination, applying a traffic shaping action in the first policy to reporting data to create a first data stream for the first data sink, and (iv) monitoring reporting data over time to determine that, at a particular time, a second condition in the second policy has been met by the reporting data, and (v) based on said determination, applying a traffic shaping action in the second policy to reporting data to create a second data stream for the second data sink (e.g. by sending a directive to another component to apply the action). The system can send the first data stream to the first data sink, and send the second data stream to the second data sink.

The traffic shaping action can be any of: thinning and throttling. Thinning can comprises dropping one or more data fields in messages in the reporting data, the one or more data fields being defined by a policy. Throttling can comprise dropping one or more messages in the reporting data to achieve a data rate specified in a policy.

The system may deal with data fields independently of message format, the data fields appearing across a plurality of message formats (e.g., CSV, protobuf, JSON) being reported in the system.

The policy can be defined to apply to a class of reporting data originating from source devices in a particular geography, such that said monitoring comprises monitoring said class of reporting data to determine that a condition in a policy has been met by the class of reporting data. The policy can also be defined to apply to a particular class of reporting data originating from source devices in a particular network, or autonomous system number (ASN), or particular type of source device, or reporting data that was generated associated with a source device providing service to a particular type of client and/or providing service under a particular contractual arrangement.

In another non-limiting aspect, a system includes one or more computers having circuitry forming one or more processors and memory storing computer program instructions for execution on the one or more processors to operate the system. The system includes a plurality of source devices generating reporting data, the reporting data comprising a plurality of messages arriving over time, each message having one or more data fields. The system further includes a data collection system that receives the reporting data from the source devices, processes that reporting data, and provides processed reporting data to a data sink. The processing of reporting data being performed at least in part by: (i) the data collection system receiving a policy for the data sink, the policy being defined by a respective owner of the data sink, where (ii) the policy comprises: a condition upon which a traffic shaping action is triggered and a two-part definition of a class of reporting data. The two-part definition can include a first part specifying a characteristic of messages in the reporting traffic upon which to select messages, and a second part specifying a criteria upon which to group messages having the characteristic specified in the first part. The policy is interpreted such that each group of messages resulting from applying the two-part definition being considered a class of reporting data against which to evaluate the condition. The processing of reporting data further can be performed by (iii) monitoring each class of reporting data defined in the policy to determine whether the condition in the policy has been met, and (iv) based on a determination that the condition has been met, applying the traffic shaping action to reporting data to create a data stream for the data sink. The system can also send the data stream to the data sink.

With respect to the policy, the first part can specify reporting data originating from source devices in a particular geography. Applying the traffic shaping action can be done by sending a directive to a plurality of distributed data collection processes (e.g., local to the source devices) to perform the traffic shaping action, or to any other component or device in the path of the reporting data. The monitoring of reporting data in (iii) can include generating periodic measurements of reporting data, and/or generating a set of models for reporting statistics about reporting data that is anticipated.

The foregoing is a description of particular non-limiting aspects of the teachings hereof for purposes of illustration only; it is not a definition of the invention. The claims define the scope of protection that is sought, and are incorporated by reference into this brief summary. The claims are incorporated by reference into this section.

BRIEF DESCRIPTION OF THE DRAWINGS

The invention will be more fully understood from the following detailed description taken in conjunction with the accompanying drawings, in which:

FIG. 7 is diagram illustrating, in pseudo-code of the general characteristics of a data collection and processing system such as the LLDC 300 shown in FIGS. 5-6, according to one embodiment of the teachings hereof;

DETAILED DESCRIPTION

Figure 1:
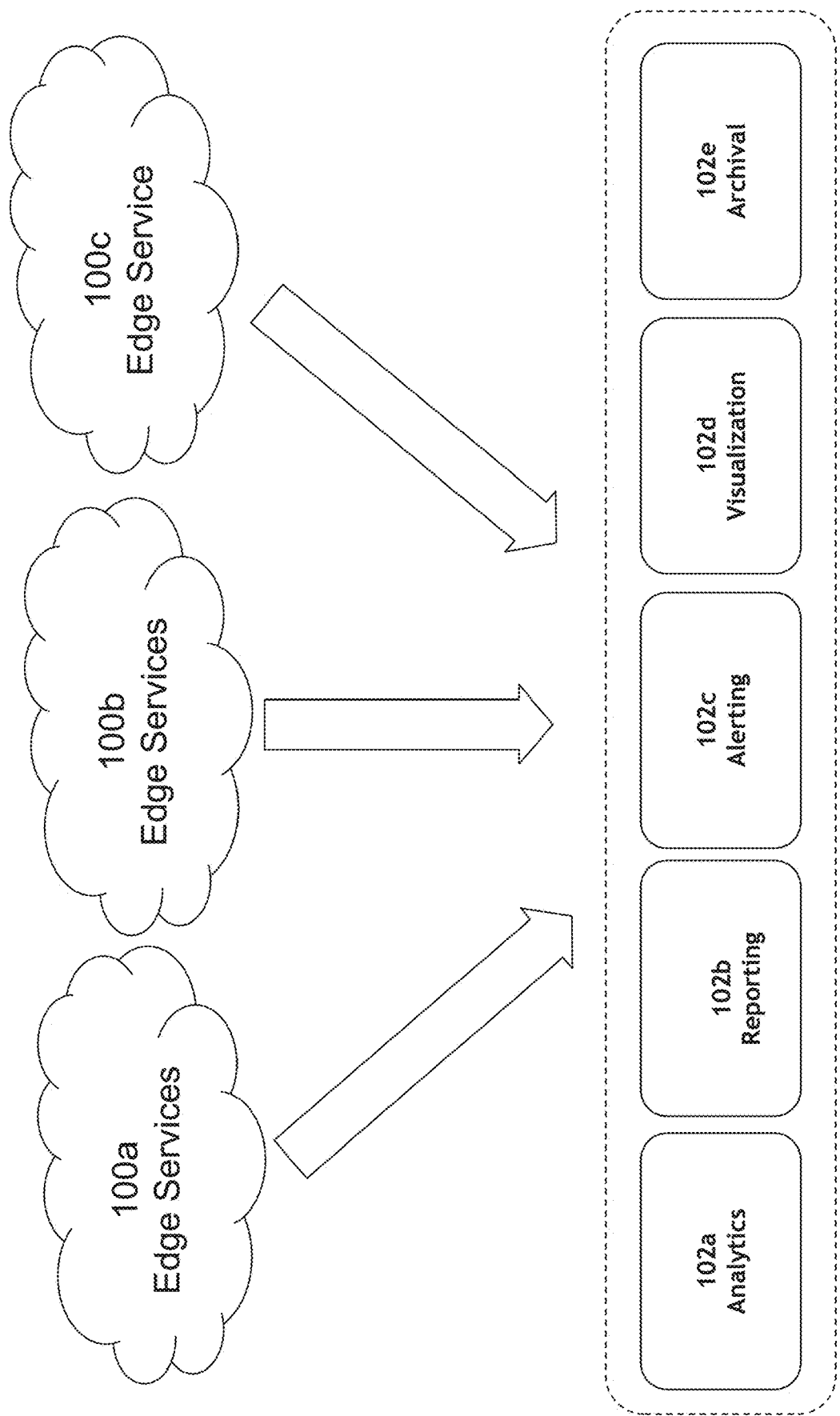
FIG. 1 is a diagram illustrating edge services producing reporting data and sending it towards data sinks, according to one embodiment of the teachings hereof.

The following detailed description sets forth embodiments of the invention to provide an overall understanding of the principles of the structure, function, manufacture, and use of the methods and apparatus disclosed herein. The systems, methods and apparatus described in this application (whether in this section and in other sections) and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references listed anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain any such advantages and benefits in order to practice the teachings hereof.

Basic familiarity with well-known web page, streaming, data processing, and networking technologies and terms, such as HTML, URL, XML, AJAX, CSS, HTTP versions 1.1 and 2, DNS, HTTP over QUIC, TCP, IP, TLS, and UDP, is assumed. The term "server" is used herein to refer to actual or virtualized hardware (a computer configured as a server, also referred to as a "server machine" or "virtual server") with software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented using any combination of hardware and software.

In some embodiments, the teachings hereof provide an overload protection system that protects data sinks from overload by controlling the volume of data sent to those data sinks. The protection system preferably sits in between sources of data, such as edge servers, IoT devices or other producers of data, and data sinks that will receive some or all of the reporting data generated by the sources. The protection system may be implemented as an enhancement to, and/or to interoperate with, a data collection system that collects the data from the edge servers. The reporting data, typically, is a stream of messages which are triggered by events at the edge servers. The term "reporting data" refers broadly to any kind of data generated that may need to be limited to provide overload protection, and is not intended to limit the nature of the data, but rather to distinguish from other data that may be referred to in the operation of the techniques described herein.

Data sinks face challenges in handling the ingestion of reporting data from large distributed systems. Each data sink might have unique requirements for things such as the connection type that it expects, the data rate, and cardinality that it can handle safely, as well as the retention requirements. An overload protection system can prevent overload by enforcing limits and/or settings defined by the owner of each data sink. Preferably, each data sink owner defines a policy to control how and when overload protection will be applied. Put another way, each data sink can set its own policy on on when and how to limit the volume of reporting data being sent to that data sink.

Examples of data sinks are systems that are receiving and using data, such as edge server monitoring systems, analytic systems, storage systems, network security intelligence systems, alarm systems, and others.

Each policy in the overload protection system can include detailed specifications of how to monitor the input stream of reporting data for overload conditions and which throttling actions are to be taken by the protection system if the conditions are met and/or exceeded. An example of a triggering condition is exceeding a rate limit in bits per second; another example is exceeding a limit on the cardinality of a certain data field in a group of messages. An example of a throttling action is thinning the messages in an input stream of reported data destined for a particular a data sink, e.g., by removing specified fields within each message in the data stream. Another example is a to throttle the data, e.g., by dropping whole messages within the stream of reporting data, so that the overall data rate meets a certain limit.

A policy can contain a multi-part specification about the class(es) of traffic to which the condition applies. For example, the policy can specify that only messages originating from edge servers in a particular geography should be examined to see if the condition has been met, or messages having some other attribute. Further, the policy can specify that messages within that geography (i.e., having the attribute from the first part) further should be grouped on some basis (i.e., according to specified criteria) and the condition tested against each resulting group of messages. As will be seen below, the power and flexibility of this approach to defining and applying policies is significant in this technical field.

FIG. 1 illustrates edge services (100a-c or generally 100) generating data as a result of (and about) their interactions with clients, and providing it to any of several back-end systems (data sinks 102a-e, generally 102). One example of such data are web server logs. Each of the edge services depicted in FIG. 1 may be provided by a large number of distributed edge servers distributed around multiple networks (e.g., around the Internet). Also, a given edge server may provide multiple edge services or be customized to provide just one kind of edge service. Any number of edge services 100 may be provided.

Figure 2:
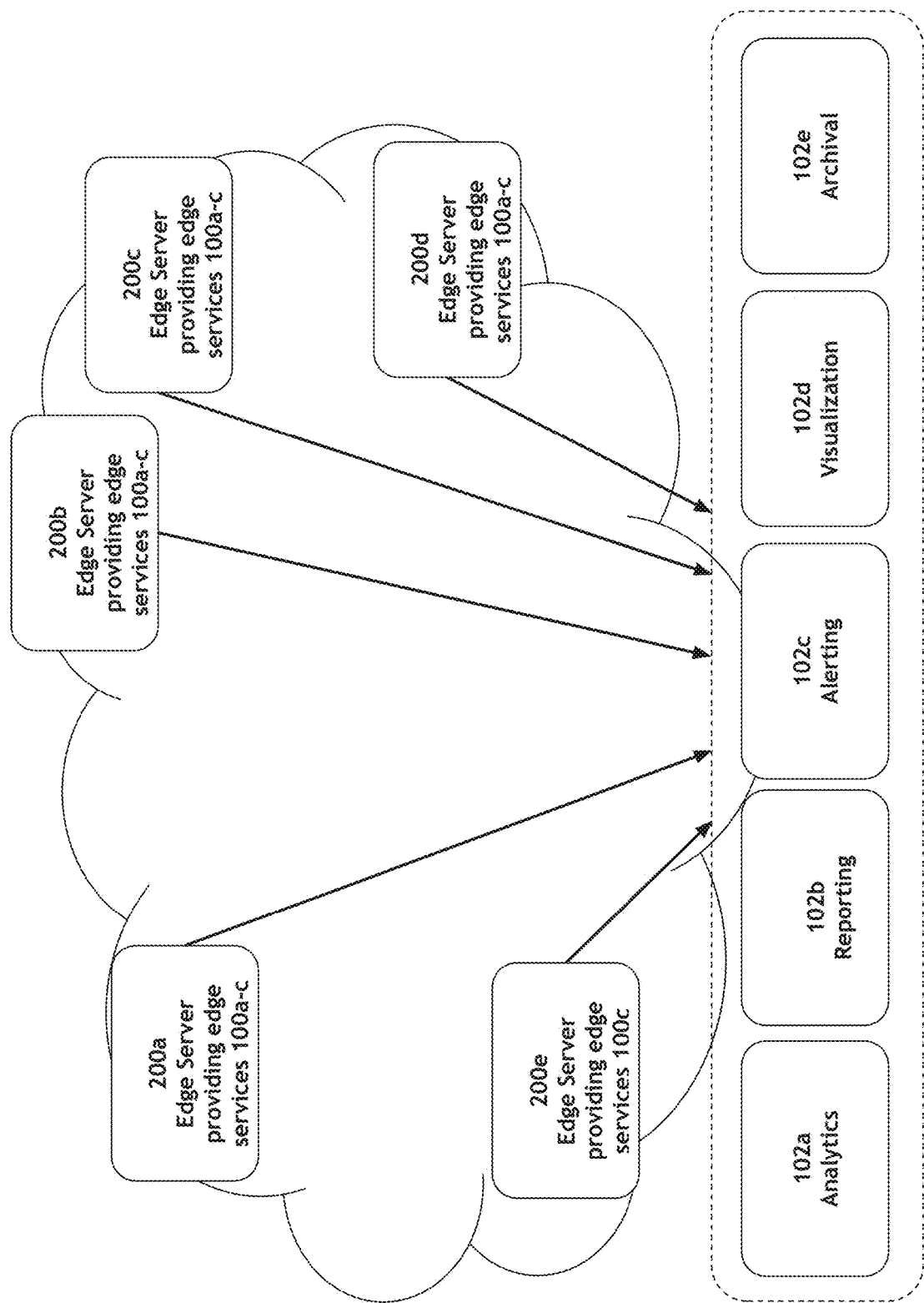
FIG. 2 is a diagram illustrating edge servers providing the edge services and producing reporting data and sending it towards data sinks, according to one embodiment of the teachings hereof.

FIG. 2 is similar to FIG. 1, but it is a hardware-oriented view that illustrates edge servers (200a-e or generally 200) distributed around the Internet, each providing one or more edge services 100, to the back-end components. The arrows in FIGS. 1-2 represent network connections, the components being deployed remote from one another on the Internet. Any number of edge servers 200 may be provided.

The edge servers 200 may be servers deployed in a content delivery network, or CDN, which is described later in this document. However, that is merely one embodiment.

Edge services 100 typically represent services provided to requesting clients (not shown in FIG. 1). The provision of such services typically results in the services generating logs, alerting messages, download receipts, reports on firewall activation or malicious or anomalous network activity, or other information about or as a result of the edge services 100. There is an ever-increasing number of edge services 100 being provided to clients on the Internet, leading to larger numbers and variety of edge services 100, wider distribution, larger volume, and larger and thus more varied consumers (the data sinks 102) of reporting data.

In some embodiments, edge services 100 may not be client-server type services. For example, the edge servers 200 may be replaced by any source of data. For example, the sources of data be a set of distributed Internet of Things (IoT) devices, such as sensors, monitors, actuators, or cameras, that are generating data about their status and/or an environment, a device, appliance, machine, vehicle, person, or system with which they are associated. Generalizing, the teachings hereof broadly apply to any kind of data producing device, or source device, of which edge servers 200 providing edge services 100 in a CDN is one example. The term "reporting data" is used to refer broadly to any and all of such data provided by such devices.

Reporting data typically consists of a stream of messages. For example, when an edge server 200 provides a particular edge service 100 to a client, it can generate a log with data fields such as {requesting-client-ip, requesting-client-user-agent, URL, bytes served, timestamp}. These logs may be sent out as individual messages or aggregated into summary messages of a time period. If the edge service is providing a firewall, the message might contain other information, such as the firewall rule that was triggered, or a portion of a client request that triggered the firewall. For teachings about a firewall service, please see e.g., U.S. Pat. No. 8,458,769, the contents of which are hereby incorporated by reference in their entirety.

A low latency data collection (LLDC) system may be provided to gather the reporting data from the edge services, to aggregate it, decorate it, remove redundancies, and provide it to data sinks, e.g., back end systems such as the analytics, reporting, alerting, visualization and archival systems 102 that are shown in FIG. 1.

Figure 3:
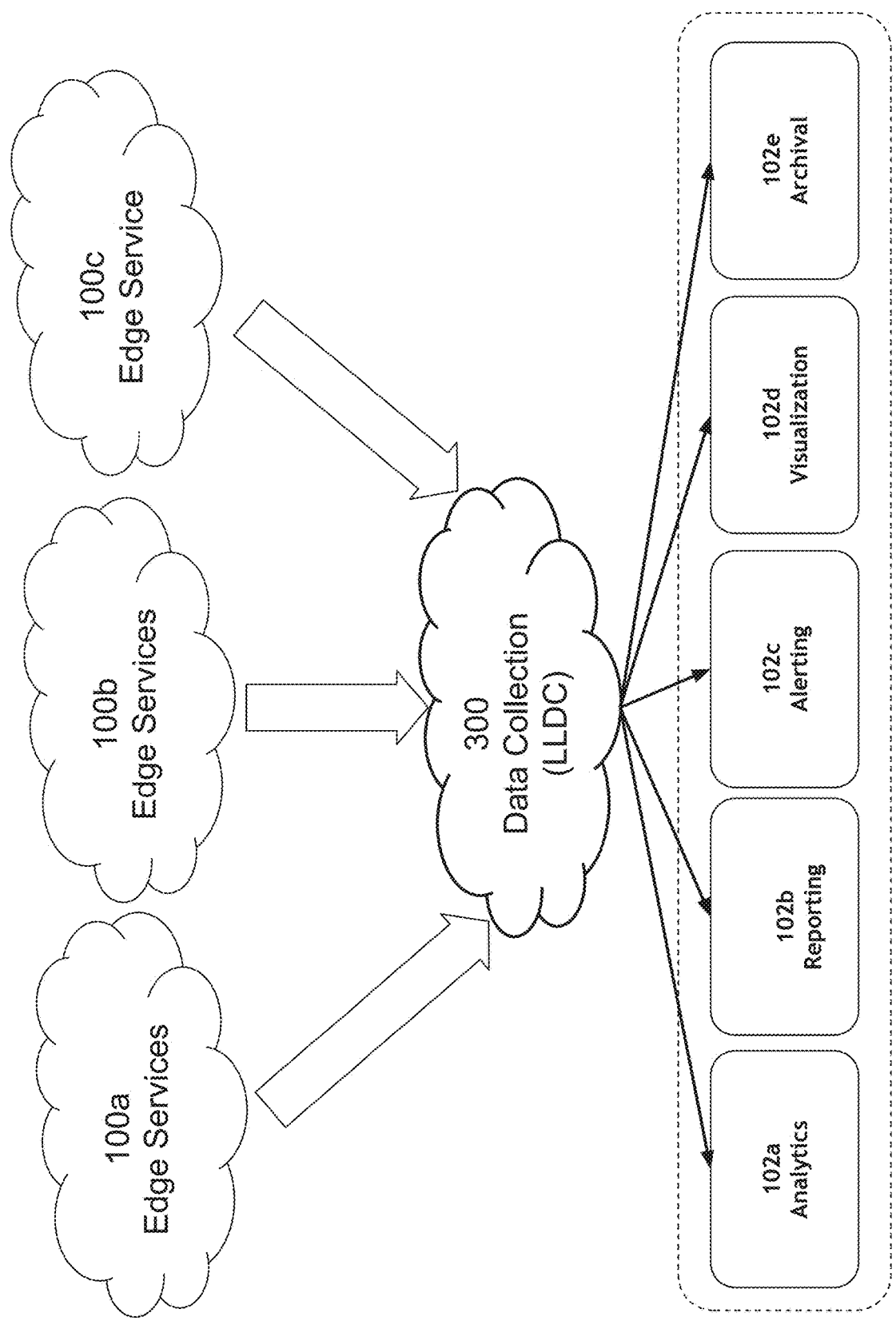
FIG. 3 is a diagram corresponding to FIG. 1 but adds a low-latency data collection system (LLDC) between the edge services and data sinks, according to one embodiment of the teachings hereof.
Figure 4:
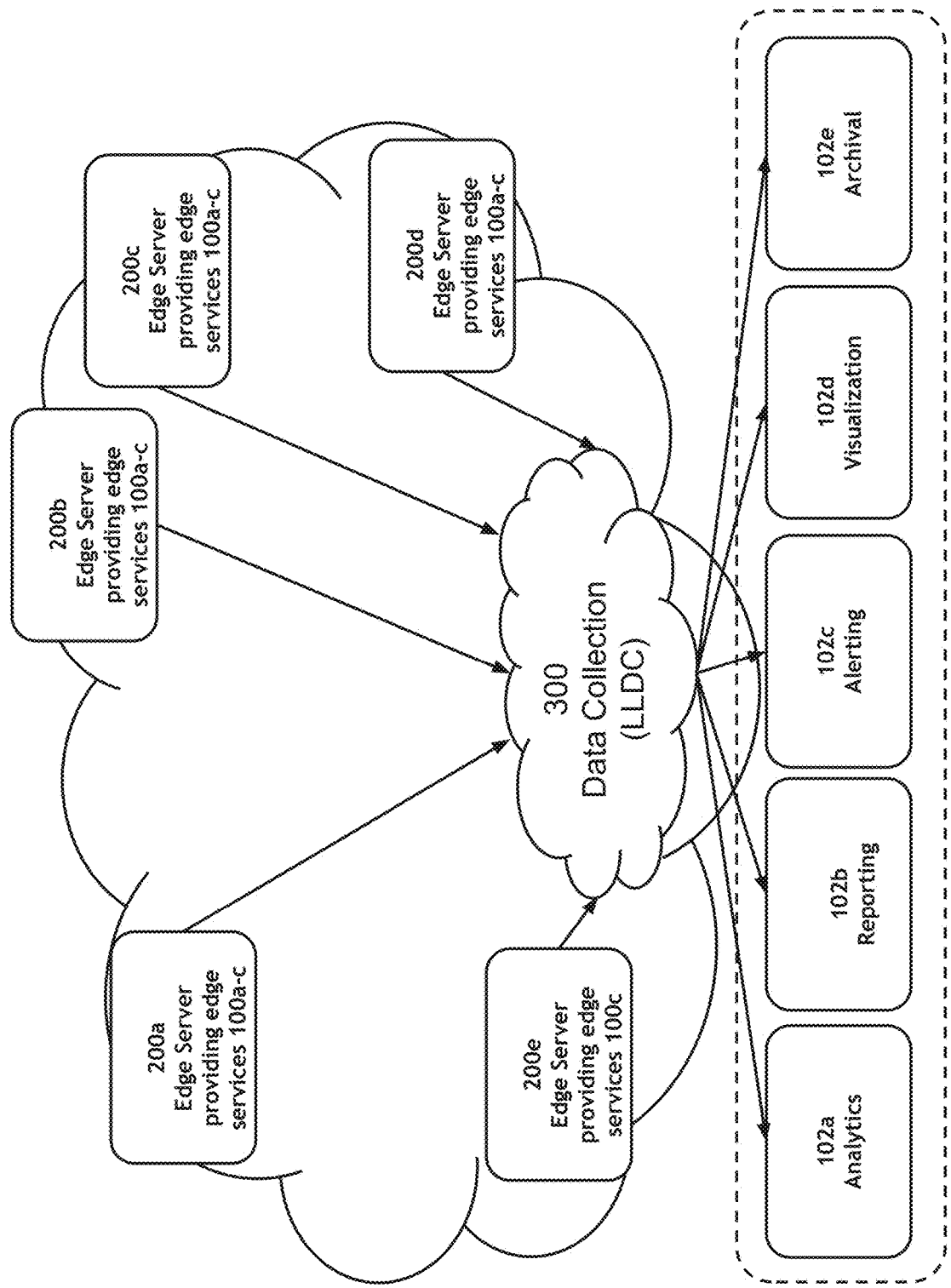
FIG. 4 is a diagram corresponding to FIG. 2 but adds a low-latency data collection system (LLDC) between the edge servers and data sinks, according to one embodiment of the teachings hereof.

FIG. 3 is similar to FIG. 1, but adds an example of a low latency data collection (LLDC) system 300 to FIG. 1. The LLDC 300 is a component residing between the edge services 100 and the data sinks 102. The data collection system 300 provides functions such as connection aggregation, data aggregation, data enhancement or decoration, buffering, filtering, and fanout. FIG. 4 is similar to FIG. 2 but likewise adds the LLDC system 300.

Figure 5:
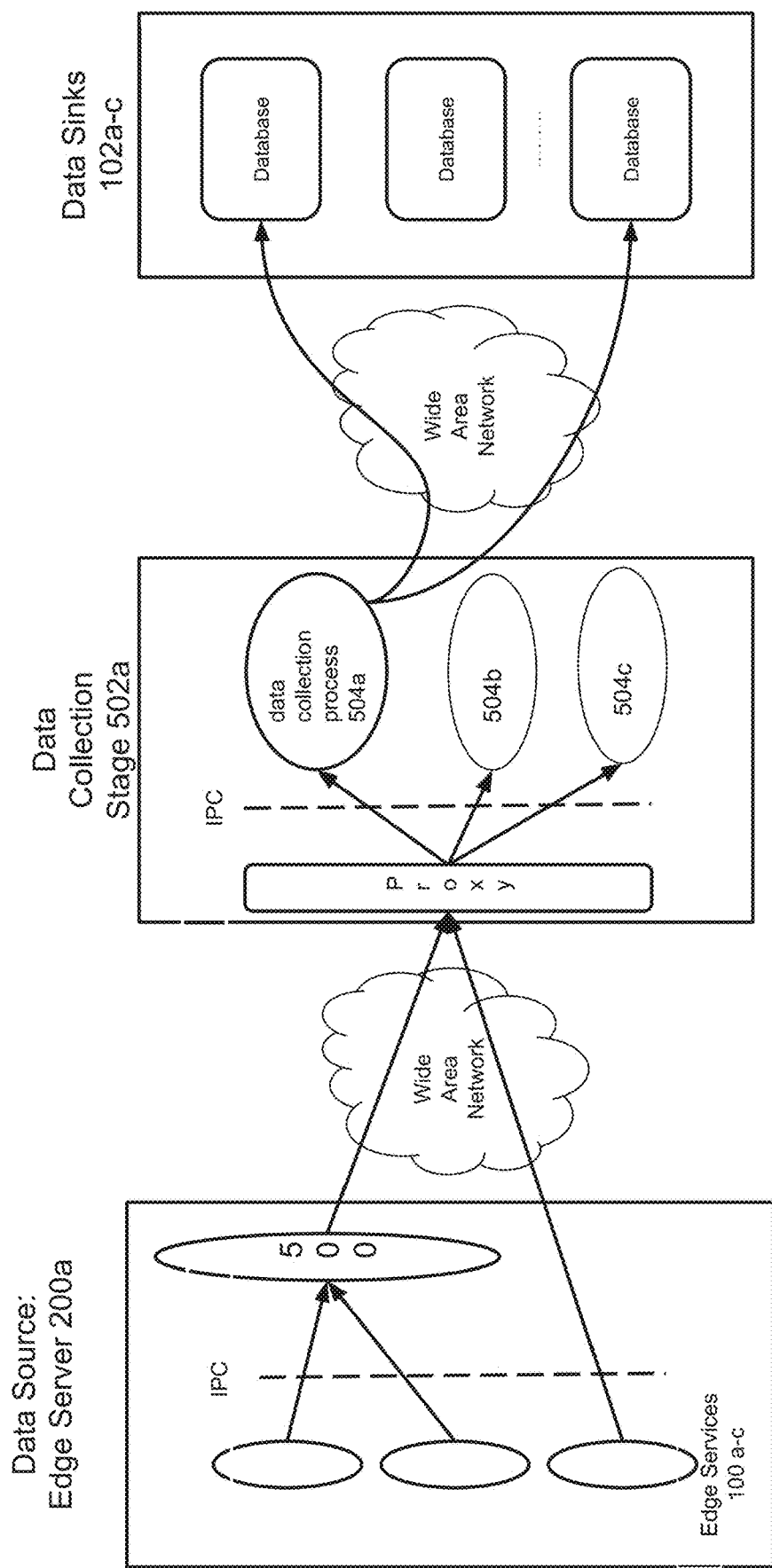
FIG. 5 is a diagram illustrating the LLDC system in more detail, according to one embodiment of the teachings hereof.

FIG. 5 is a schematic view illustrating how the LLDC system 300 works. Again, the data sources are edge services 100 running on edge servers 200a. This means that the edge services 100 run as one or more software processes on the edge server 200a. A given edge service 100 provides the reporting data to a local data collection process 500 running on its edge server 200a. That local process 500 is the first stage of the LLDC system 300. The local process 500 gathers this data via known inter-process communication (IPC) techniques.

The reporting data is collected from one or more edge services 100 and aggregated locally in the edge server 200a by the local data collection process 500. Several edge servers 200 may be grouped together in a data center (e.g., connected via LAN) and the local data collection process 500 for one of them may act as leader, collecting data from the others nearby edge servers 200a in the cluster and aggregating it. The local data collection process 500 then transports this data over a wide area network (e.g., via HTTP POST or other mechanism) to an HTTP proxy that is part of a hierarchical data collection stage 502a of the LLDC system 300. In this stage additional collection, aggregation, redundancy removal, and decoration can be performed in a scaled manner, with processes 504a-c.

In some cases, an individual edge service 100 process may bypass the local collection 500 and send their messages directly to the data collection stage 502a. This is shown by the bottom-most arrow bypassing the data collection process 500.

FIG. 5 also shows how the data stream sent out of the data collection stage 502a is made available to some data sinks 102. In this figure, the data sinks 102 are illustrated as databases and data analytics systems, (e.g., Cassandra or Hadoop or Kafka systems, or the like). These are merely possible implementations associated with the data sinks 102' semantically, the data sinks 102 depicted in FIG. 5 are the databases that support and provide the raw data to analytics, reporting, alerting, visualization system etc., mentioned earlier and shown for example in FIGS. 1-4.

Figure 6:
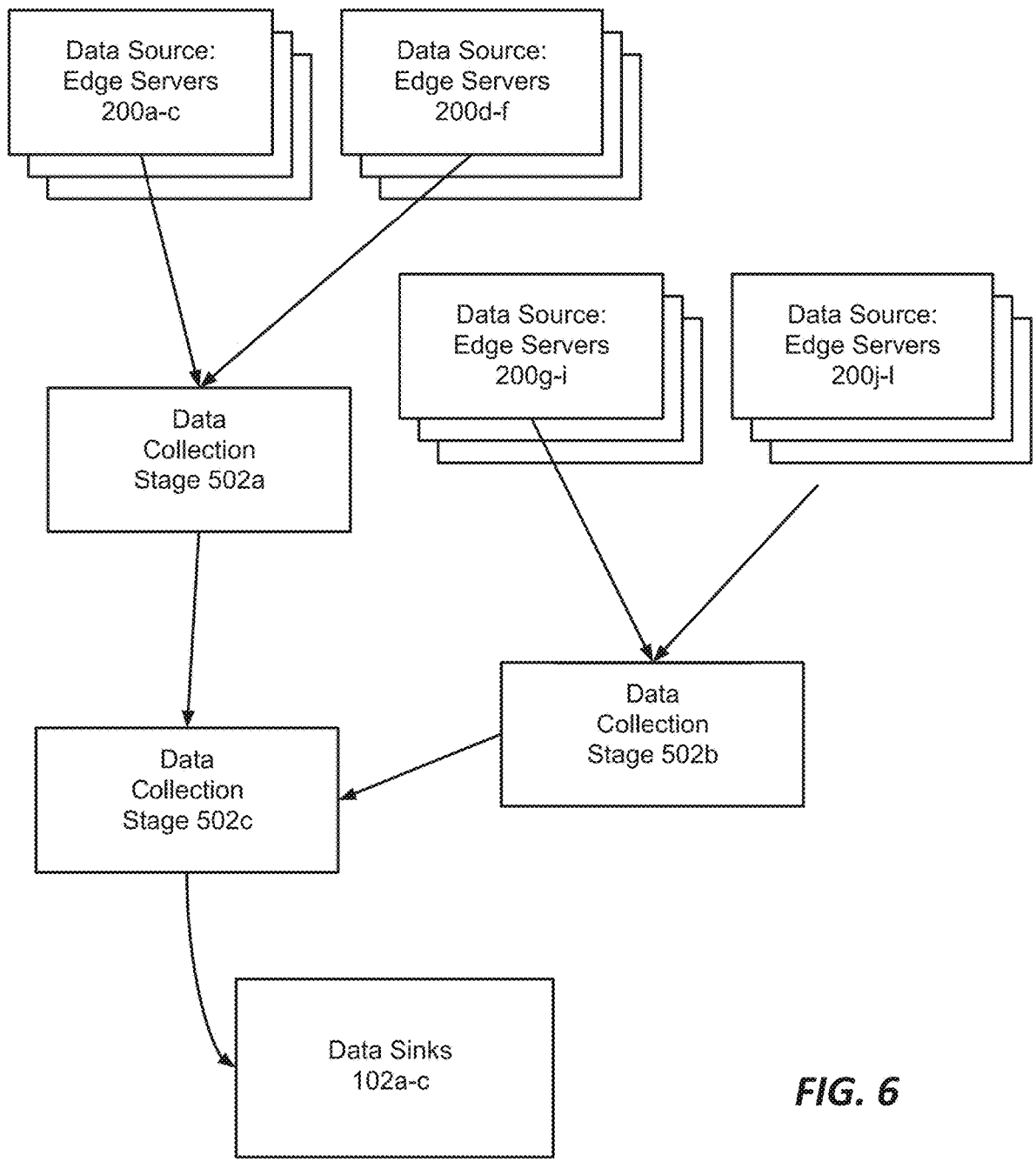
FIG. 6 is a diagram illustrating another view of the design of the LLDC system shown in FIG. 5, in order to show the hierarchical nature of reporting data aggregation, according to one embodiment of the teachings hereof.

In sum, in FIG. 5 the data sources send messages to a local agent (LLDC local process 500) or over the Internet. The LLDC collection stage 502a proxy (which can be implemented in various ways) can be used to receive the data and pass it to the processing instances 504a-c. Note that in a typical system, multiple edge servers 200a feed into a given data collection stage 502a, and multiple data collection stages 502a-c may be provided, some ingesting data from other data collection stages in a fan-in arrangement—in other words creating a hierarchical aggregation and processing tree where the reporting data is interpreted, statistics about this data are retrieved, and any message transformations are performed before it is sent out the data to the sink systems 102a-c by a final stage 502c. The hierarchical nature of the LLDC 300 is shown in FIG. 6, where each of the edge servers 200 and data collection stages 502 represent nodes in the hierarchy. Any number of levels are possible.

FIG. 7 is an illustration, in pseudo-code of the general characteristics of a data collection and processing system such as the LLDC 300 shown in FIGS. 5-6, in one embodiment. In general, the LLDC operation can be controlled, in one embodiment, via a system of callbacks. An application (or applications) that is written to configure/control the operation of the LLDC 300 (or interfacing with it) can specify in code actions to be performed upon a message being received (a process) or upon a temporal event (a timeout). Further, an application may specify that the processed message may be sent to a different node (e.g., a higher tier data collection stage 502) in the hierarchy shown in FIG. 6. This is termed an "emit". The nodes in the LLDC hierarchy can be identified by abstract names (ff::LLDC::fe) and edges induced by reporting data emitted( ) along the edges connecting a source and a destination. The foregoing functionality enables the LLDC (and the hierarchy) to be highly configurable and changeable by system operators, based on system needs.

Some potential attributes of the LLDC system 300 are: Data Driven Execution, as exemplified by a lack of centralization and horizontal scaling. Stateless Stages, providing fast recovery and low processing cost. Externalized queues, providing feedback and elasticity. Geographical diversity, which helps smooth network glitches and enables global load balancing. The foregoing attributes can help the LLDC system 300 to handle the high data volumes generated by large distributed systems, such as CDNs.

More specifically, in many embodiments, there is no centralized controller and each data collection stage 502a-c is a node in the network (as shown in FIGS. 5-6) is capable of performing all functionality. The aggregation (inverted tree topology) is induced through routing messages to different parts of the network. This allows the LLDC system 300 to dynamically adjust its size. When processing more data, more nodes must be involved in data processing. This reduces the aggregation but improves data availability. In contrast, when the volume is low, using fewer nodes improves the aggregation ratio while maintaining data availability. Preferably, the LLDC system 300 uses the Domain Name System and load feedback to that system to perform global adaptation. Global adaptation may be is sufficient for longer time horizons but is not for fast reaction time. The LLDC system 300 can utilize externalized queues that can be monitored to estimate the load on each node within the region and dynamically change the topology of the message routing.

An overload protection system can be integrated with and supplement the LLDC system 300 described above. The overload protection system can provide the data-sink defined overload protection being described herein.

In some embodiments, the overload protection system can be characterized as an enhancement to or a subsystem of the LLDC 300, sharing many components and/or representing an enhancement to such components. In other embodiments, the overload protection system can be implemented as part of or separately from the LLDC 300. In the description that follows, the overload protection system 800 is used to refer to the additions to the previously-described LLDC 300 components, and/or to the enhanced portions of the previously-described LLDC 300 components, which collectively provide the overload protection function.

Figure 8:
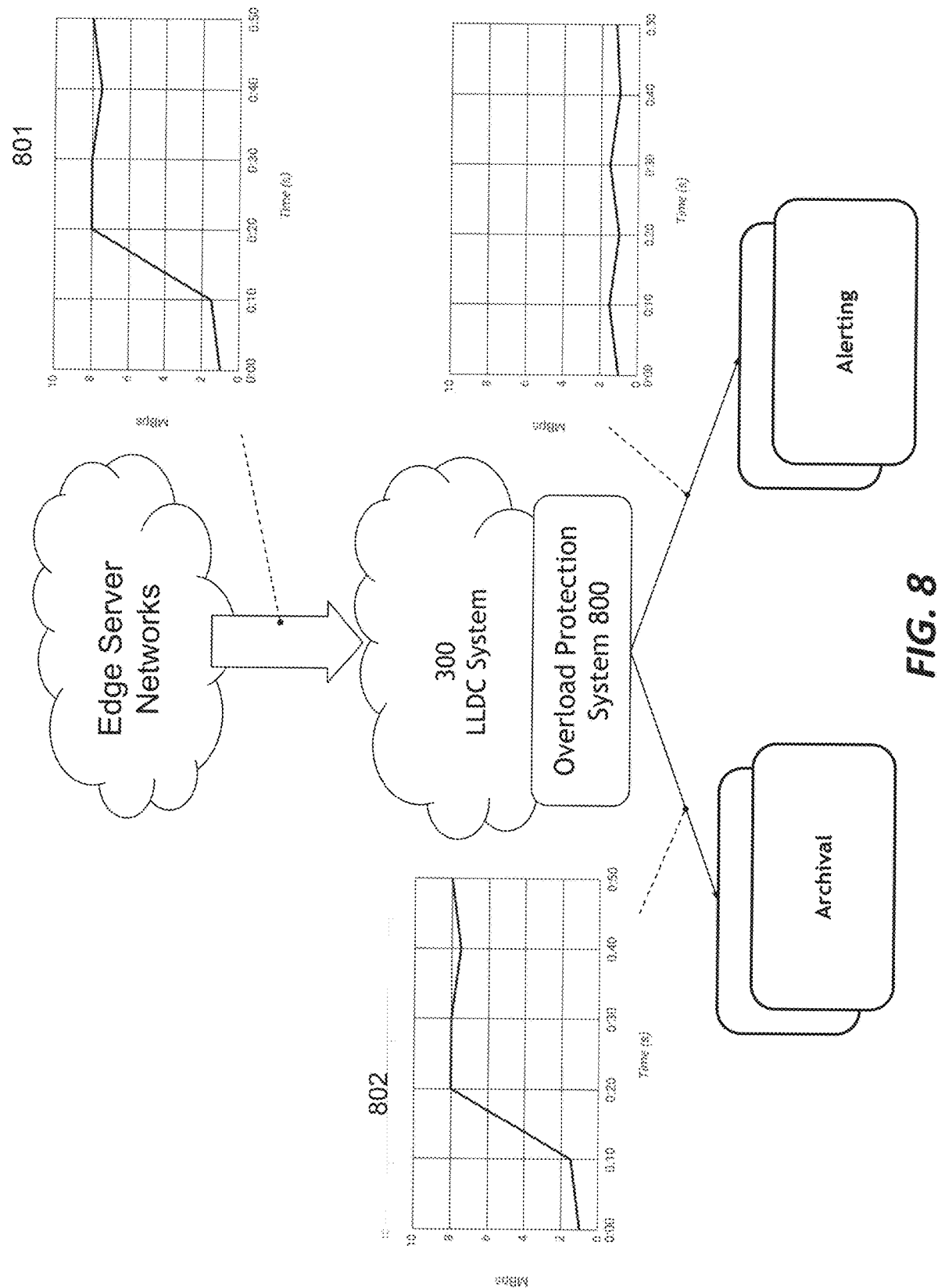
FIG. 8 is a diagram illustrating an overload protection system that can be implemented in combination with and/or within the LLDC, and an example of the effect of the overload protection system on data streams, according to one embodiment of the teachings hereof.

FIG. 8 illustrates one embodiment of the overload protection system 800. Assume that the volume of data produced by the edge server networks varies with time, in reaction to client demand and activity. The graph 801, which is the data produced by the edge servers, shows a spike in data rate (in units of Mbps) for reported data at about 0.10 seconds. The LLDC system 300 must ingest and handle this spike in data. The 'archival' data sink is able to handle this rate of data, so the LLDC with overload protection system sends the full reporting data stream to it, as indicated by the graph on the left 802 (identical to 801). The 'alerting' data sink, however, is not able to handle this spike in traffic. The LLDC/overload protection system 300/800, however, can smoothe this "spike" so that there is a consistent stream of reporting data being sent to the alerting data sinks, as shown by the graph on the right 803. The smoothing of the spike is performed in a way that is defined by and custom to the alerting data sink, per with a policy for the alerting data sink that is independent of the archival data sink's policy.

Hence, FIG. 8 shows how the volume/rate of reported data may be different for each data sink; moreover, the limits and mitigating actions can be configured independently by the data sinks.

Figure 9:
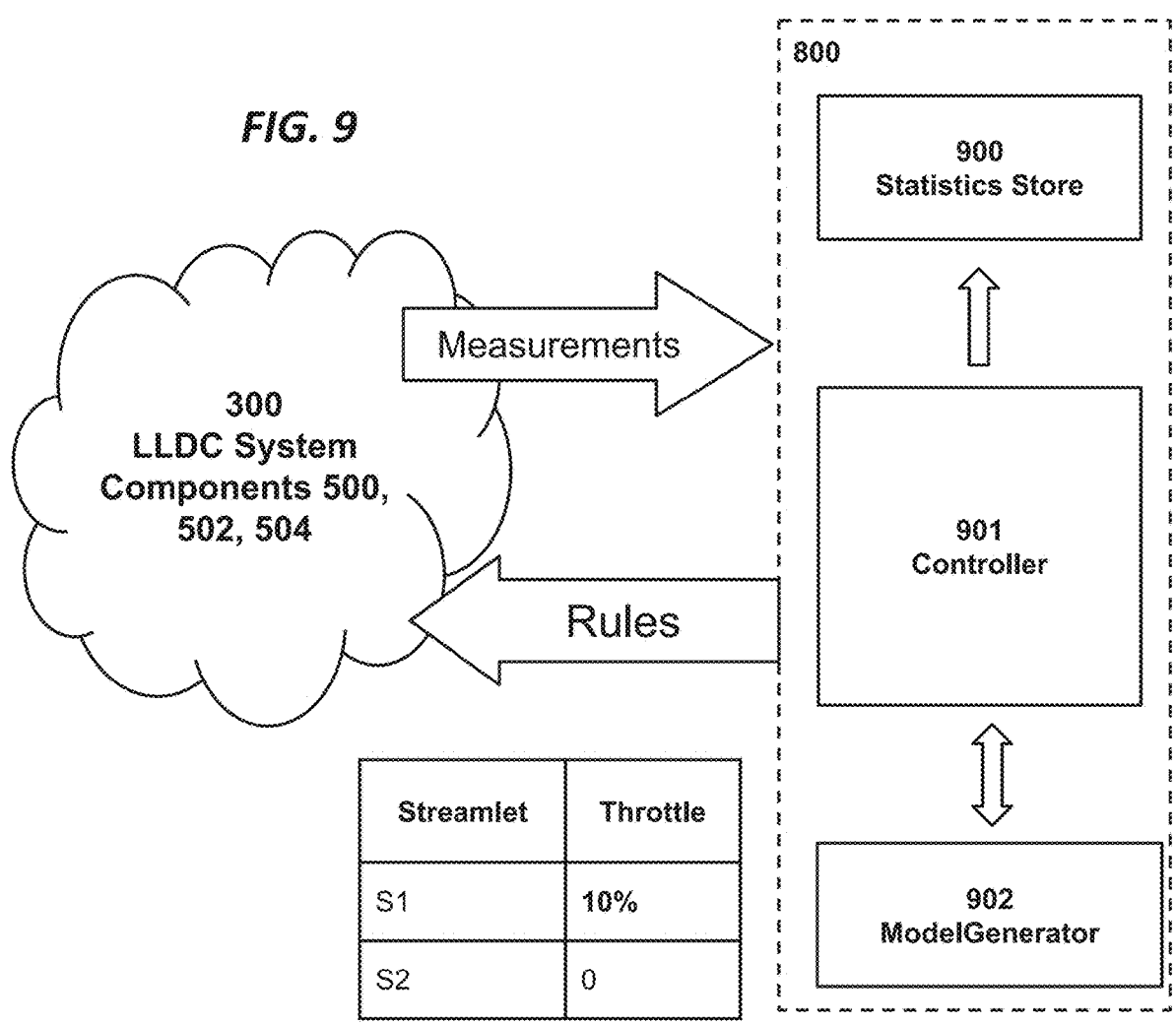
FIG. 9 is a diagram illustrating the design and operation of the overload protection system at a high level, according to one embodiment of the teachings hereof.

FIG. 9 shows one embodiment of how the overload protection system 800 works and how it interacts with the aforementioned components of the LLDC 300, at a high level. The data collection processes 500 and/or intermediate stages 504 are periodically (e.g., every few seconds) producing measurements on the amount of reporting data that is being generated and that could be sent to the data sinks. The measurements are essentially traffic statistics. The controller 900 analyzes the measurements and and produces rules to control the amount of reporting data. The reporting data is classified into "buckets" and "streamlets", and each bucket and streamlet can be measured and rules applied independently. In FIG. 9, the streamlet S1 is being subjected to a ten percent throttling action.

Each bucket and streamlet combination is a traffic class defined by certain characteristics that will be described in more detail below. A bucket can also be used alone to define a traffic class, without a streamlet.

Figure 10:
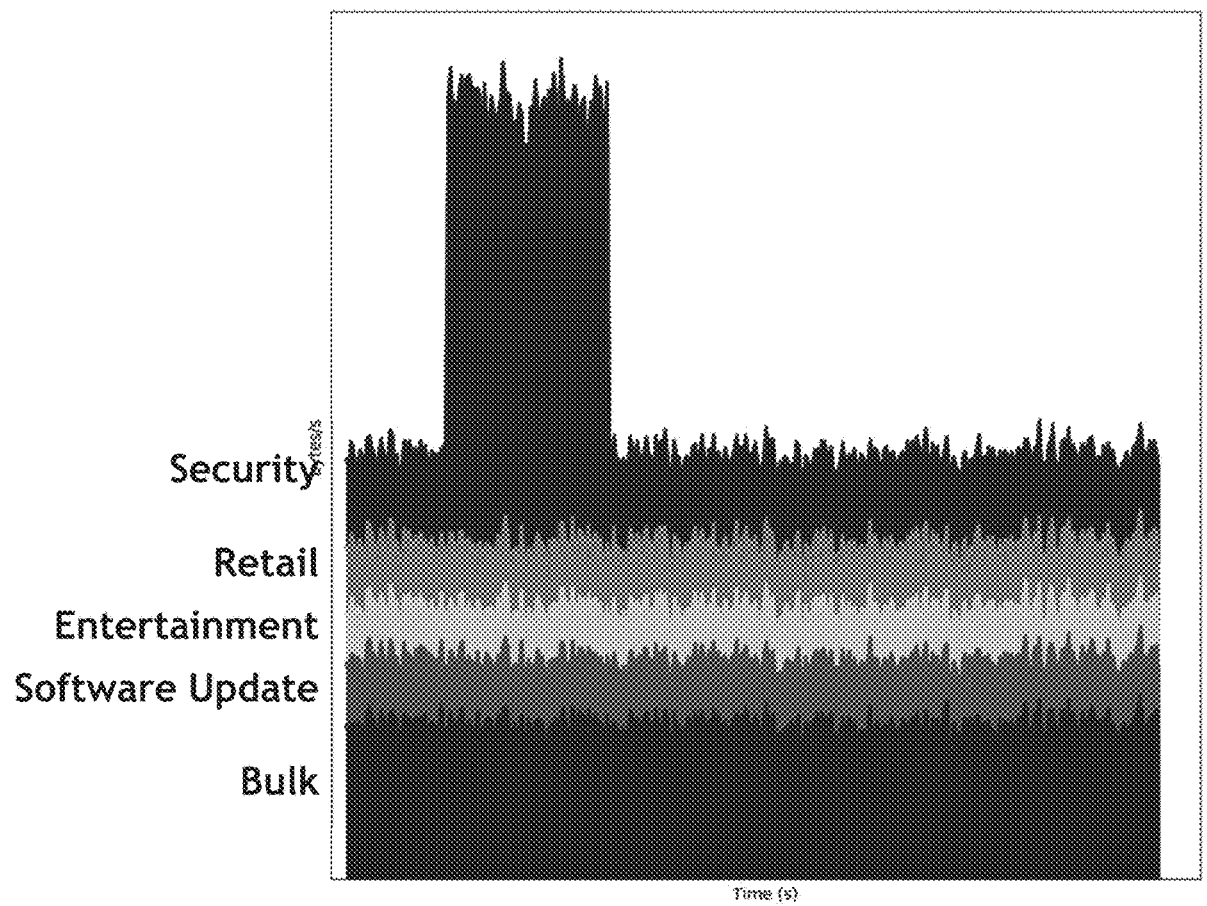
FIG. 10 is a diagram illustrating an example of a stream of data with multiple classes of data within it, according to one embodiment of the teachings hereof.

FIG. 10 is a graph showing an example of reporting data traffic over time, with each band representing a different type of traffic. This is a synthetically generated traffic pattern of reporting data. It illustrates the kind of traffic that the overload protection system 800 can handle and smoothe. The top two highest volume data classes of the data stream are the "security" and the "bulk" categories. As can be seen, the traffic related to security, which is security monitoring/firewalling, is spiking independently of the others. The overload protection system 800 operates to address this kind of a spike in a precise way, limiting the data rate of the spiking data while not affecting the others (as opposed to coarsely limiting the entire data rate across all classes of the data, for example).

Assume, as another example, that edge services 100 are providing web site delivery services on a multi-tenant basis for many websites at once (the websites are customers who have hired the edge services 100 operator to deliver their websites, as in a CDN). Hence, the overall stream of reporting data contains data about many different websites— and a graph similar to FIG. 10 could be developed that classifies data by customer. Assume further that traffic related to a given customer's website consists of two classes of messages A and B, which occur at rates 1 message per second and 100 messages per second, respectively. When the spike occurs, B increases to 1000 messages per second. The overload protection system 800 can operate to only thin/throttle the B messages, not the A messages. This can be accomplished by the owner/administrator of a data sink 102 (i.e., the data sink that is going to receive the reporting data in this example) creating separate classes for A and B and defining policies specific to each.

Data Model for Overload Protection System 800

The data model used in the overload protection system 800 and it policies is now described.

As mentioned above, reporting data is typically a stream of messages emanating from edge services 100, aggregated through LLDC 300 components. In one embodiment, a suitable data model can be illustrated in the following hierarchy:
1. Stream {application, source, sink}
   a. Bucket {defined-parameter}
      i. Policy for bucket
      ii. Streamlet {dynamic-parameter}
         1. Policy for streamlet A "stream" within the reporting data is defined by a tuple: {application, source, sink}. The 'application' typically refers to the process, subprocess or feature in the edge server 200 with which the stream is associated. The application provides, alone or in combination with other applications, an edge service 100. An edge service 100 can have a one to one relationship with an application, so the term application could be replaced by edge service in the model. Examples of applications include: firewall, content-delivery (aka HTTP proxy), or some other identifiable product/service.

In an IoT context, the 'application' can be a label for the function being provided by an IoT device, e.g., a sensor function or monitoring function.

The source identifies the source of the data stream. Examples of the source include: 'edge-network-identifier', which uniquely identifies a given edge server 200 or group of edge servers 200. The source could also be a virtual source; the use of virtual sources and sinks is described in more detail later in this section.

The 'sink' is the data sink that will consume this data; these are the same as the data sinks 102 shown in prior Figures. As an example, if the stream were from a firewall service in an edge server 200, then a pertinent example of a data sink 102 might be an analytics component 102a that was running security analytics.

The 'bucket' and 'streamlet' in the above data model are used to define the class of data to which a particular policy applies, to prevent overload of the data sink. Taking a step back, the owner/administrators of a particular data sink 102 can define policies that the system 800 will apply to the reporting data traffic to create an output stream that the particular data sink 102 will receive. As mentioned, the overload protection system 800 provides for a bucket and a streamlet to be defined on a property or feature of the messages in a stream of reporting data. The bucket and streamlet combination enable a policy to be specifically applied to a class of reporting data. Put another way, they define how the reporting data should be monitored for an overload condition. If the condition is triggered, the policy defines a traffic shaping action that the overload protection system 800 should take to protect the data sink.

The overload protection system 800 policy can have a two-part definition of a class of reporting data.

First, a policy can include a statement isolating traffic based on "STABLE" properties of the data. For example, such a property might be a product identifier, client geography identifiers, etc. that can be efficiently enumerated and a coarse grained policy defined for these. These are the aforementioned 'buckets'. (Note that a policy can be applied at the bucket level, as shown in the example above ("policy for bucket"). In other words, the bucket also defines a class or reporting data, it is however a single-part definition of a class of reporting data.)

Second, a policy can additionally include a statement specifying traffic based on dynamically changing properties; these are the aforementioned streamlets. A streamlet is applicable to each value of the feature that is seen, rather than some specific value of the feature. For example, assume a streamlet is defined with respect to a dynamic feature "customer-code", where the customer-code means the code for a given one or a large number of customers of a CDN. This means that the reporting data traffic (within the bucket) is grouped into streamlets on the basis of customer-code, and the streamlet policy is applied to each streamlet independently. Another example is to group messages by URL. Put another way, the effect of the streamlet definition is similar to the "group by" statement in SQL. This means that instead of defining a policy for each streamlet independently, we can define one policy and have it applied to each streamlet within the bucket, so that it will catch the streamlet(s) with the most volume.

An example of a populated data model is now provided. Note how the bucket specifies a literal value (USA), whereas the streamlet is with respect to a dynamic feature that can take on multiple values.

1. Stream (firewall, edge-network-1, threat-analytics)
    a. Bucket (geo=USA)//traffic must be from USA
        i. POLICY: if bucket volume>1 GBps, throttle heavy-hitters
        ii. Streamlet (customer-code)//groups traffic on customer-code basis
            1. POLICY: if cardinality (URL)>1M, thin out URL field Using the approach outlined above, a policy can also be defined to apply to a particular class of reporting data originating from source devices in a particular network, and/or autonomous system number (ASN), and/or particular type of source device. It can also be defined to apply to a particular class of reporting data that was generated associated with a source device providing service to a particular type of client and/or providing service under a particular contractual arrangement. It can be defined to apply to any combination of the above criteria.

Virtual Sources and Sinks

As mentioned earlier, is is possible to have virtual sources and sinks. Virtual sources and sinks are useful when a given stream of reporting data needs to be split and delivered to two different data sinks, and each data sink needs to be able to apply its own overload policies.

A stream can have a real source (e.g., a particular edge-network of edge servers) but a virtual sink. The virtual sink is a replication point. The replication point also serves a virtual source to the downstream data sinks. The replication point is not necessarily an actual point in a network, rather, it is interpreted by the overload protection system 800 as an instruction to replicate a stream of reporting data and then look to the policy for each of the resulting two streams to determine how to provide overload protection for that stream before sending it to the associated data sink.

For example, to achieve a fan-out of two, assume a replication point is defined as {virtual-sink, virtual-source-1, virtual-source-2}. A first stream of reporting data can be defined as {application, edge-network-1, virtual-sink}. A second stream emanates from the replication point, with a definition of, e.g., {application, virtual-source-1, analytics}. A third stream also emanates from the replication point, with a definition of, e.g., {application, virtual-source-2, alerting}. And, each stream mentioned above can have its own set of policies on a bucket and streamlet basis, one for the analytics data sink and the other for the alerting data sink.

Figure 11:
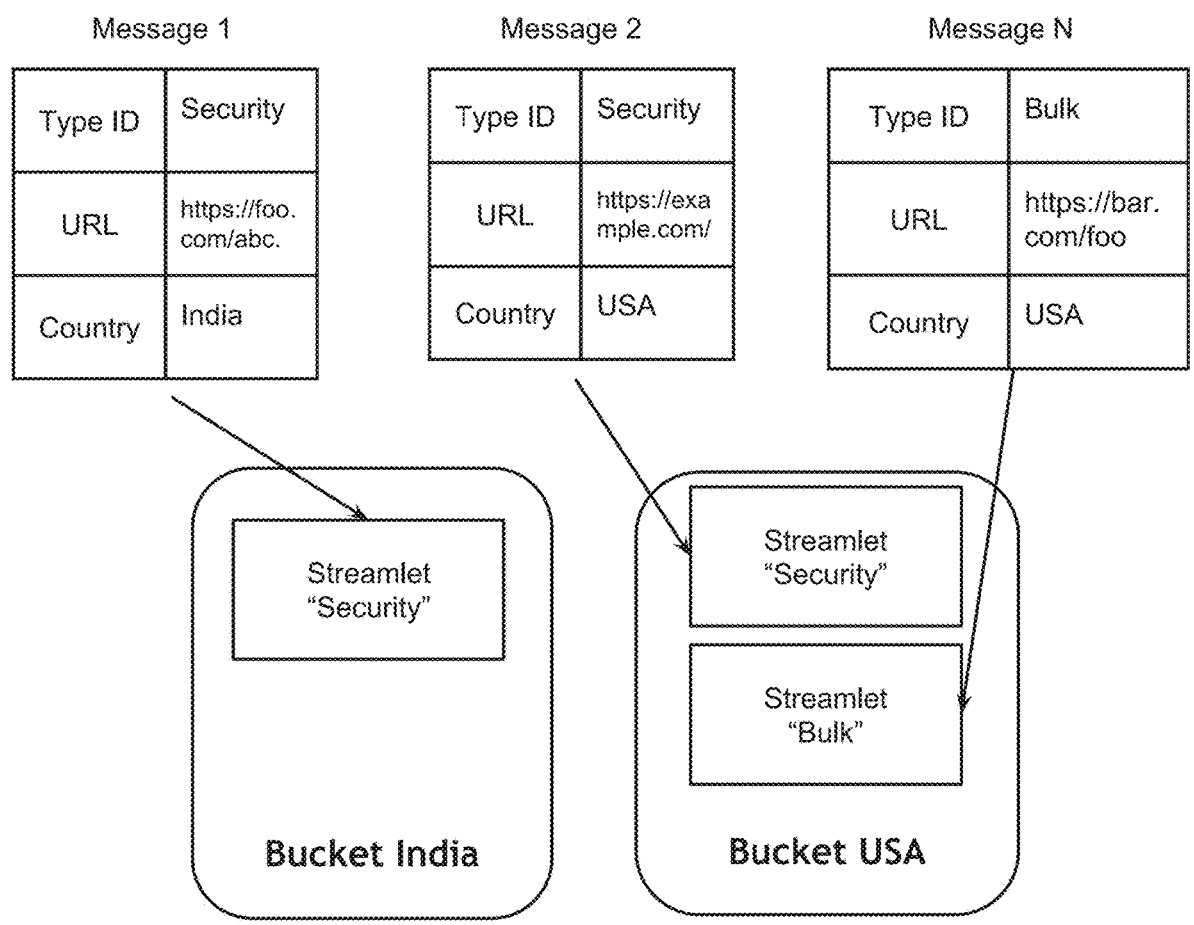
FIG. 11 is a diagram illustrating how buckets and streamlets can be used to classify traffic during policy evaluation in the overload protection system, according to one embodiment of the teachings hereof.

FIG. 11 is an illustration of how messages can be classified into a bucket/streamlet. This Figure further illustrates the concepts of buckets and streamlets as ways of classifying reporting data. In this example, the buckets are defined based on geography, that is, the reporting data has been generated by edge services being provided in (edge servers located in) India, USA, etc.

A streamlet could be based on any criteria, but in FIG. 11 it is shown as being for "security" traffic and for "bulk" traffic. This is merely illustrative. The terms "security" and "bulk" are merely generic examples of values of a data field "Type-ID" that is in this example of reporting data. Thus in this example, the streamlets are defined on the basis of this "Type-ID" field, meaning that the messages within a given bucket is grouped into streamlets on the basis of having like "Type-ID" values.

Below are some examples of policies for bucket and streamlet combinations within a given stream. Once again, the policies are defined by the owner/administrator of the data sink to which the stream applies.

1. Stream (firewall, edge-network-1, threat-analytics)
    a. Bucket (geo=India)
        i. Streamlet (Type-ID)//groups traffic on customer-code basis
            1. FIRST POLICY: if cardinality (URL)>1M, thin out URL field
    b. Bucket (geo=USA)
        i. Streamlet (Type-ID)//groups traffic on customer-code basis
            1. SECOND POLICY: if bucket volume>1 GBps, throttle heavy-hitters The first policy applies to traffic generated by edge services in bucket India, and to each of the streamlets, which are grouped by the field "Type-ID". (Again, assume the reporting data messages contain field "Type-ID". In other examples, the field could be customer-code, or firewall-ruleset-id, or any other message field occurring in the messages.) The first policy provides that if the cardinality of URLs in the applicable streamlet (or more specifically, the class of data represents by the bucket & streamlet) of reporting data becomes greater than 1 million, then a thinning action should be applied to that class of reporting data before sending it to the identified data sink. As a result, the overload protection system 800 monitors the measurements and the reporting data hitting the LLDC 300 for the condition of URL cardinality becoming greater than 1 million. The thinning action means that a given data field can be removed from messages in the stream of reporting data. The reporting data, again, is comprised of a series of messages, each with a set of data fields. Hence, in this case, the URL can be removed from the messages, thus reducing the size of each message. The defined policy, seems to indicates that the data sink must not prioritize this data field highly, and would rather receive a reduced volume of traffic with degraded reporting data rather than the full data stream and possibly face failure or overload of the data sink. Other elements in the data (e.g., timestamps, information about requesting client devices, etc.) would not be removed by the this policy unless further actions were added.

The second policy above applies to reporting data generated by edge services in the USA, and for streamlets grouped by the "Type-ID". The second policy provides that if the amount of data in any streamlet grows to more than 1 Gbps, then certain streamlets of data "heavy hitters" should be throttled. The "heavy hitters" term refers to whichever streamlets are currently one of the top X traffic streamlets, e.g., by data rate.

The policies can apply in a variety of ways to thin reporting data. For example, a given data sink may be willing to drop data fields related to the client type (e.g., mobile client or not) but not the CDN customer code. The thinning action could be defined more finely, such as thinning by dropping the URL field from messages, but only if the message relates to a edge services transaction with a mobile device. A wide variety of flexible configurations are possible, and a given data sink can update their policies as the ingest capabilities of that data sink increase or otherwise change.

Thinning Action

As noted above, the action "thinning" means to reduce the size of each message by removing a subset of fields in the message. This improves aggregation of data. It can be thought of as strategic degradation of data.

Now provided is an example of thinning. Suppose the reporting data messages coming through the LLDC system 300 contain the fields ClientID and a URL, as follows:

| Message N | |
|---|---|
| Type-ID | Security |
| URL | https://example.com/a/b/c/d/e?params=longstringfromdict |

| Message N | |
|---|---|
| Type-ID | Security |
| URL | https://foo.com/a/b/c/d/e?params=longstringfromdict |

To thin by URL, the URL is dropped, resulting in the messages below:

| Message N | |
|---|---|
| Type-ID | Security |

| Message M | |
|---|---|
| Type-ID | Security |

Throttling Action

The action "throttling" means a technique of dropping a subset of messages, for example those from a set of top K heavy-hitter streamlets, to further reduce the data rate. Assume a set of messages as shown below:

| Message 1 | |
|---|---|
| Type-ID | Bulk |
| Country | India |
| URL | https://example.com/a/b/c/d/e?params=longstringfromdict |

| Message 2 | |
|---|---|
| Type-ID | Bulk |
| Country | India |
| URL | https://example.com/a/b/c/d/e?params=longstringfromdict |

To throttle by 50% the messages in the bucket India, half of the messages are dropped, resulting in a data stream with Message 1 and Message 2 dropped:

| Message 1 | |
|---|---|
| Type-ID | Bulk |
| Country | India |
| URL | https://example.com/a/b/c/d/e?params=longstringfromdict |

Throttling limits the amount of data (data rate) being transmitted in the streamlet, until the data rate drops down below the threshold. As noted above, it involves simply dropping entire messages. It has more impact but is useful for high spikes.

To apply the policies, the overload protection system 800 uses LLDC 300 components to measure reporting traffic and periodically report certain measurements (summary data reports) to the overload protection system controller 901, so that the controller 901 can determine whether the trigger conditions in the policies have been met. Preferably, traffic measurements are transformed into and communicated as summary data structures, which store a summary of elements, rather than individually (e.g., a summary of the measurements of interest in the traffic, rather than the actual traffic elements that pass through).

To store a summary of elements, rather than doing so individually, a HyperLogLog+ data structure can be used, at least in one implementation, and can provide counts and multi-set cardinality estimates.

In general, to compute the cardinality of a set with repeated elements, one could maintain each unique element (i.e., a particular URL seen in a message, or other data field value) and its counter in a table. When a new element is added, you can check this table and update the counter if the element already exists or create a new element in the table. However, this approach can be made more efficient by using a summary data structure, avoiding the need to store each element. Hence, in one implementation, HyperLogLog+ can be used to store data as a summary. Given a set, adding every new element requires computing a specialized hash of the element. At the end, to retrieve the cardinality, the data structure is queried only for the cardinality value. This enables the system to efficiently obtain a very accurate (while possibly not exact) estimate of the unique number of elements (e.g., the number of unique URLs in a set of messages). The system may not be able to find an exact particular element, nor can it necessarily recall specifically all elements that were inserted, but it can provide the measurements need to apply the policies in an efficient matter. In this way, one can use HyperLogLog+ (or equivalent) for cardinality, and randomized quantile computation, to achieve low CPU, memory, and network transfer overheads. Other examples of such data structures include Bloom filters, Count-Min Sketch, and the like.

The measurements can be computed at each data collection stage 502 and thus take advantage of hierarchical aggregation, with small clusters and aggregation at a local leader at each level in the hierarchy. Periodically, summaries of the measurements can be merged, typically with short (for example <10s) merge windows for rapid reaction time.

As noted, the preferred nature of the monitoring is hierarchical. That is, the measurements are preferably taken in each data cluster (by local data collection process component 500 in FIG. 5, as modified for this function) and then aggregated up to the data collection stage 502 and up the hierarchy of the LLDC system 300, just as occurs with the actual reporting data itself (see FIGS. 5 and 6). Ultimately the collected measurements are fed to the controller 901 (the root for the measurements data), see FIG. 9.

The use of summary data structures makes the data well-adapted to be aggregated. To start off, the summary data structures are small. Second, two such data structures can be combined to generate a new one of the same size. It follows that if the data is aggregated along an inverted tree network structure, with the leaf nodes that producing the data and repeatedly aggregating at higher levels of the tree (e.g., leaf nodes corresponding to the data sources 200*a-l* and the aggregation through higher levels 502*a-c* as shown in FIG. 6), the amount of work that the infrastructure must do can be significantly reduced. This reduction in work can be significant enough that the root for the measurements can be a single controller 901 that is able to handle all of the incoming measurements. This is a significant reduction in cost and complexity compared to running a large compute cluster.

When the controller 901 of the overload protection system 800 wants to apply an action such as thinning or throttling traffic, it can enforce this action by pushing rules down through the previously-described LLDC 300 components, which are modified to accept and enforce these rules. The rules can be propagated to the local data collectors 500 in the edge servers 200. The rules might contain a directive to thin a particular class of messages, as defined by a bucket or streamlet of messages. The directive can be to thin by thinning a particular field, or by throttling messages falling within certain buckets or streamlets. It is preferable to apply the thinning/throttling actions earlier on in the LLDC system 300 (at the edge server 200), as opposed to the end of the system, where volumes of data are higher.

In cases where the buckets are tied to geography, if a policy is triggered only for a subset of one or more buckets defined in the system, then the thinning/throttling rules can be pushed down only to edge servers in those particular geographies.

Returning to FIG. 9, the collected measurements are fed to the controller 901. The controller 901 uses these metrics to build a model. The model is used to predict future load based on the past observations. The rules are disseminated to the LLDC processes 500, 502, 504, which can then enforce them. The statistics are also made visible through the statistics store.

One way of creating the model is to calculate an exponentially weighted linear interpolation. it is also possible to leverage machine learning models trained on the historical data, which can lead to increasingly accurate predictions of future load, allowing the system to be proactive in applying overload controls to thin and/or throttle.

Figure 12:
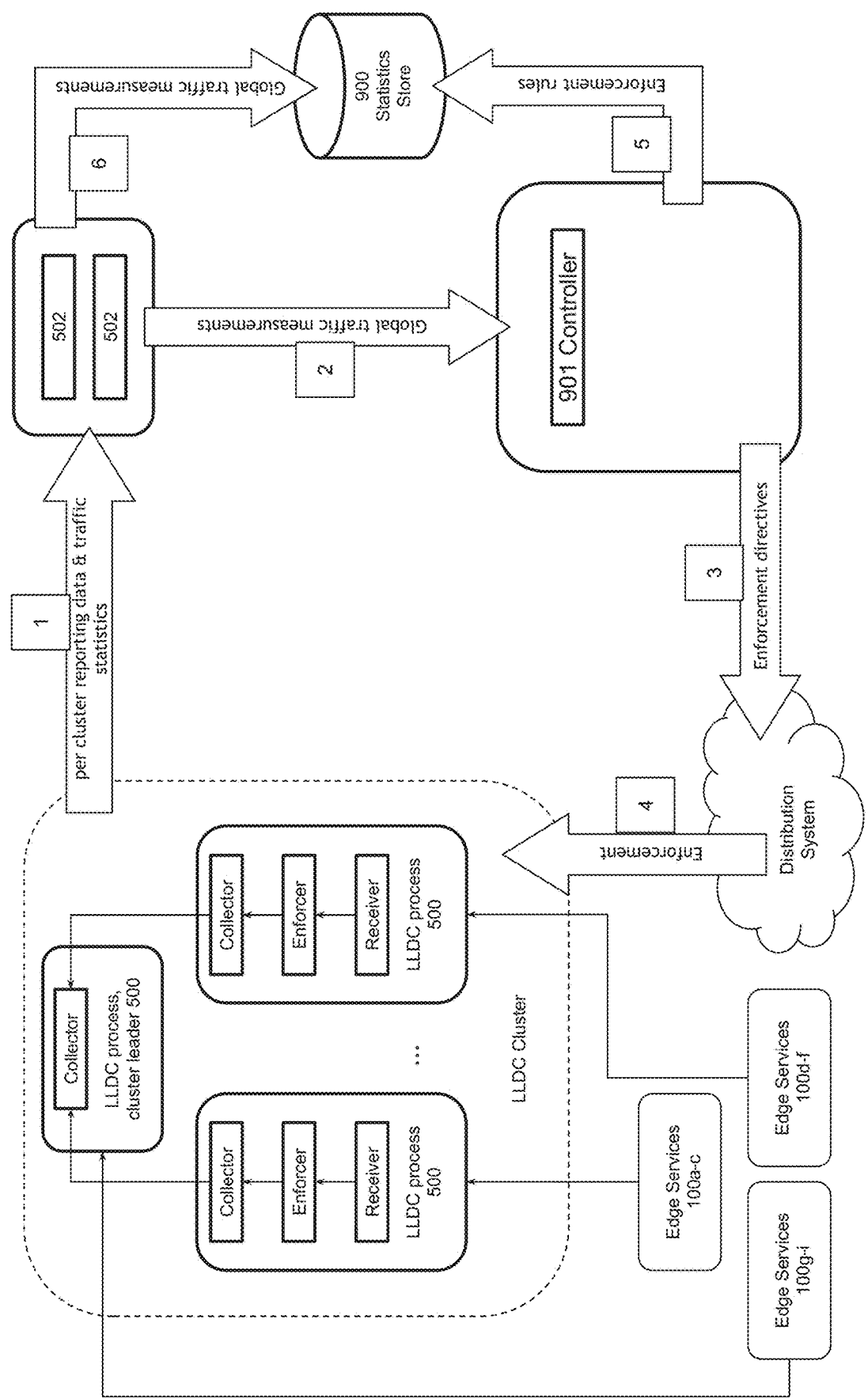
FIG. 12 is a diagram illustrating the design and operation of the overload protection system at a detailed level, according to one embodiment of the teachings hereof.

FIG. 12 is a detailed diagram of the overall architecture of the overload protection system 800. On the left, the LLDC processes 500 ingest messages from the edge services. This means that the edge services 100 in an edge server 200 generate messages and send them to the local data collection processes 500. A cluster of edge servers with multiple processes 500 elects a group leader to collection all reporting data and measurements for the group, and provide to upstream data collection stages 502 for aggregation, at (1). At (6), global traffic measurements are sent to the statistics store (which is useful for the aforementioned machine learning training as they represent historical traffic). Global traffic measurements are also sent at (2) to the controller processes 901 (of which there may be multiple for redundancy and scaling purposes).

The controller process(es) 901 apply the overload policies that have been described previously, thereby generating thinning/throttling or other enforcement directives (sometimes referred to as enforcement rules). These are distributed at (3) and (5). The distribution system can be implemented in a variety of ways, and is not crucial to the teachings hereof; one example is to send the rules using a metadata distribution system such as described in U.S. Pat. No. 7,240,100, or the techniques described in U.S. Pat. No. 7,149,807, the contents of both of which are hereby incorporated by reference. At (4), the enforcement rules arrive at the local LLDC processes 500 on the edge servers 200, which can apply the action as the reporting data messages are generated by the edge services 100.

Internet of Things

As noted, the teachings hereof can be applied equally to manage the data being collected from any type of data-generating source. In some embodiments, rather than being edge servers, the sources are IoT devices, such as sensors, actuators, appliances, monitors, cameras.

Content Delivery Networks

As the teachings hereof can be applied in the context of a CDN, a general overview of CDN components and operation is now provided.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 13:
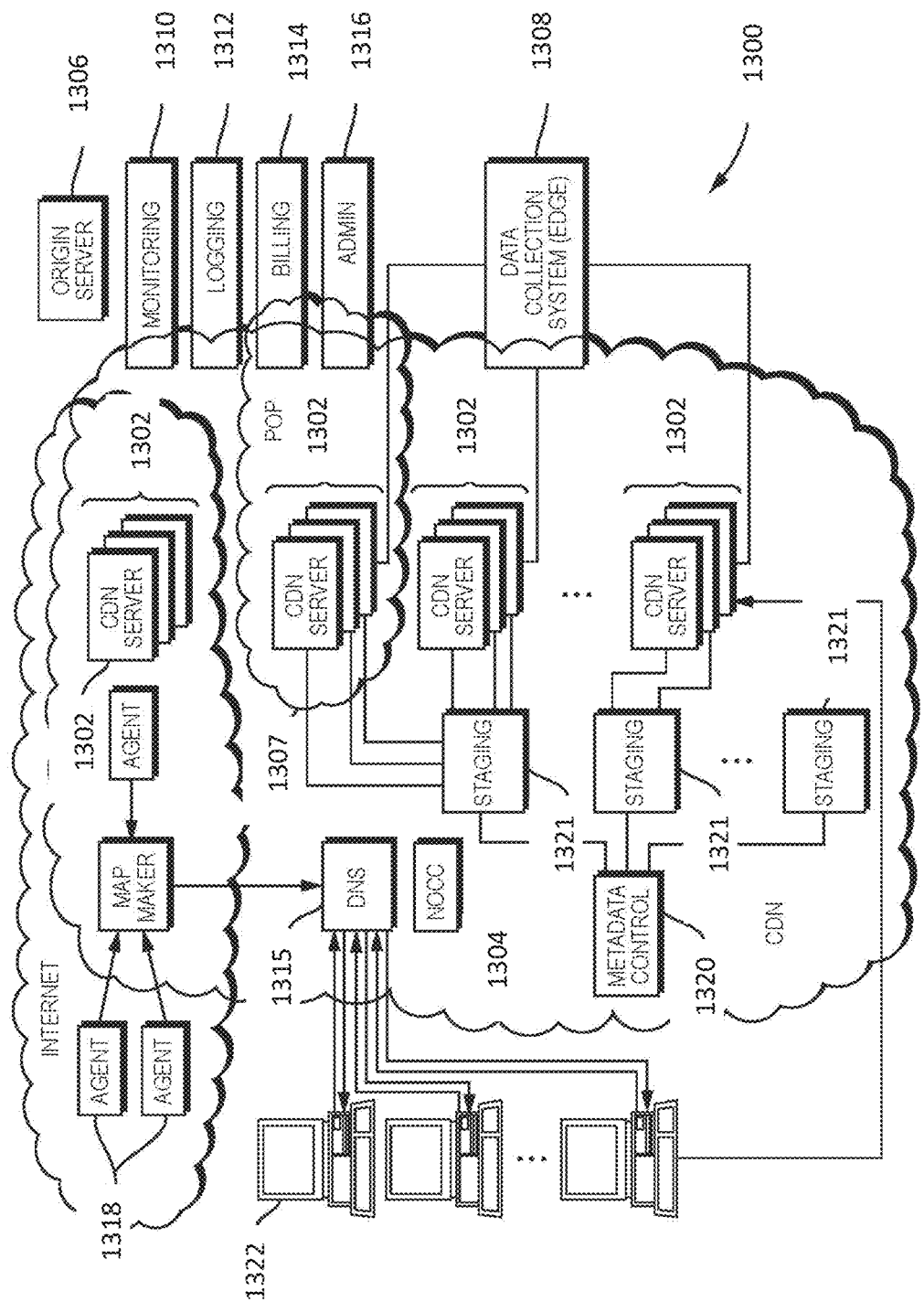
FIG. 13 is a diagram illustrating an embodiment of a content delivery network (CDN) in which the teachings hereof may be implemented; and, FIG. 14 is a block diagram illustrating hardware in a computer system that may be used to implement the teachings hereof.

In a known system such as that shown in FIG. 13, a distributed computer system 1300 is configured as a content delivery network (CDN) and is assumed to have a set of machines 1302 distributed around the Internet. The machines 1302 are servers and can be reverse proxy servers. It is the machines 1302 that are known as "edge servers" and provide the "edge services" referred to in FIG. 1 and otherwise throughout this document.

A network operations command center (NOCC) 1304 may be used to administer and manage operations of the various machines in the system. Third party sites affiliated with content providers, such as web site 1306, offload delivery of content (e.g., HTML or other markup language files, embedded page objects, streaming media, software downloads, and the like) to the distributed computer system 1300 and, in particular, to the servers 1302 (which are sometimes referred to as content servers, or sometimes as "edge" servers in light of the possibility that they are near an "edge" of the Internet). Such servers may be grouped together into a point of presence (POP) 1307.

Typically, content providers offload their content delivery by aliasing (e.g., by a DNS CNAME) given content provider domains or sub-domains to domains that are managed by the service provider's authoritative domain name service. End user client machines 1322 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 13, the distributed computer system may also include other infrastructure, such as a distributed data collection system 1308 that collects usage and other data from the CDN servers, aggregates that data across a region or set of regions, and passes that data to other back-end systems 1310, 1312, 1314 and 1316 to facilitate monitoring, logging, alerts, billing, management and other operational and administrative functions. Distributed network agents 1318 monitor the network as well as the server loads and provide network, traffic and load data to a DNS query handling mechanism 1315, which is authoritative for content domains being managed by the CDN. A distributed data transport mechanism 520 may be used to distribute control information (e.g., metadata to manage content, to facilitate load balancing, and the like) to the CDN servers.

A given server in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 1302 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No.

7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 14:
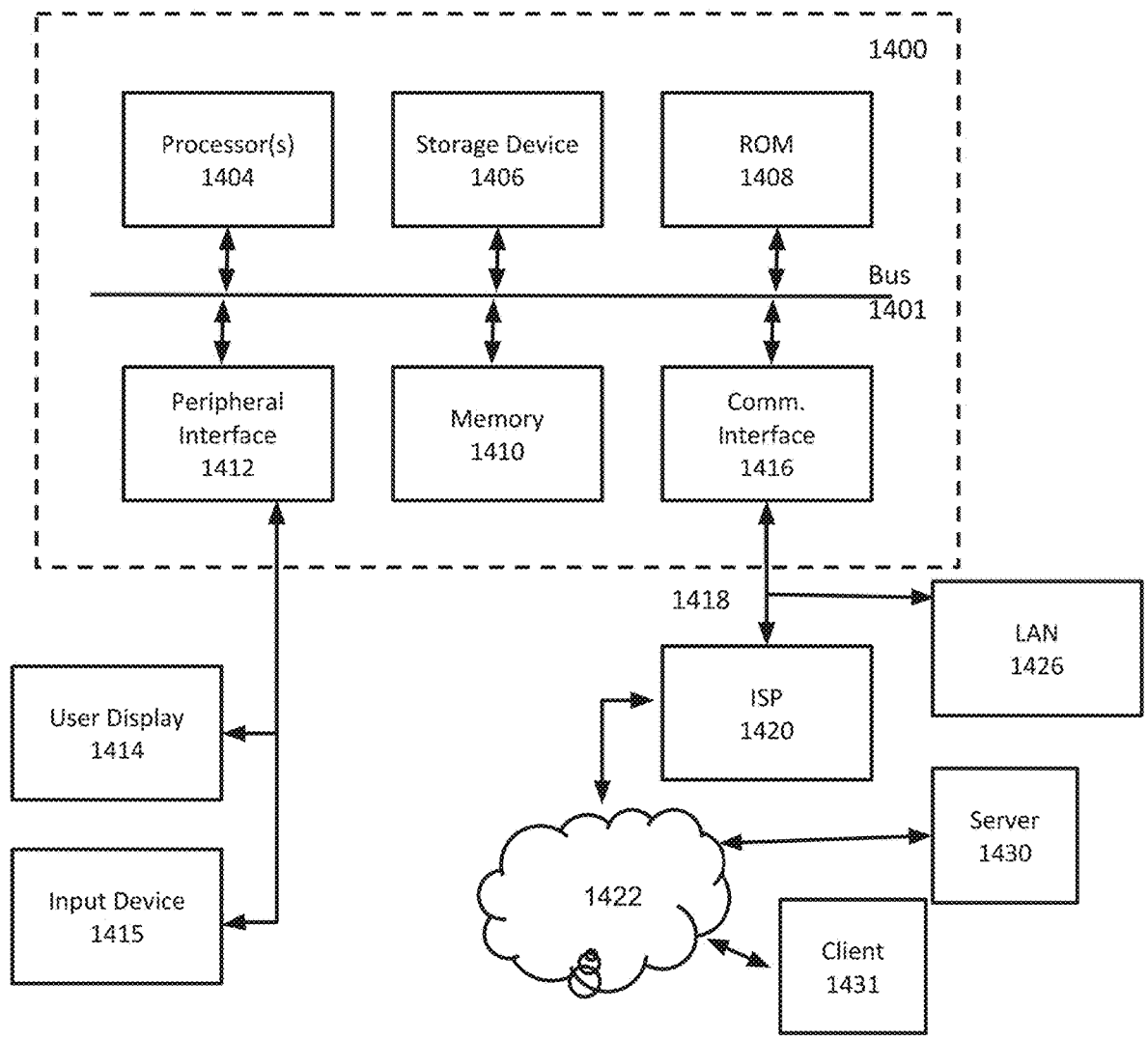

FIG. 14 is a block diagram that illustrates hardware in a computer system 1400 upon which such software may run in order to implement embodiments of the invention. The computer system 1400 may be embodied in a client device, server, personal computer, workstation, tablet computer, mobile or wireless device such as a smartphone, network device, router, hub, gateway, or other device. Representative machines on which the subject matter herein is provided may be Intel-processor based computers running a Linux or Linux-variant operating system and one or more applications to carry out the described functionality.

Computer system 1400 includes a microprocessor 1404 coupled to bus 1401. In some systems, multiple processor and/or processor cores may be employed. Computer system 1400 further includes a main memory 1410, such as a random access memory (RAM) or other storage device, coupled to the bus 1401 for storing information and instructions to be executed by processor 1404. A read only memory (ROM) 1408 is coupled to the bus 1401 for storing information and instructions for processor 1404. A non-volatile storage device 1406, such as a magnetic disk, solid state memory (e.g., flash memory), or optical disk, is provided and coupled to bus 1401 for storing information and instructions. Other application-specific integrated circuits (ASICs), field programmable gate arrays (FPGAs) or circuitry may be included in the computer system 1400 to perform functions described herein.

A peripheral interface 1412 communicatively couples computer system 1400 to a user display 1414 that displays the output of software executing on the computer system, and an input device 1415 (e.g., a keyboard, mouse, trackpad, touchscreen) that communicates user input and instructions to the computer system 1400. The peripheral interface 1412 may include interface circuitry, control and/or level-shifting logic for local buses such as RS-485, Universal Serial Bus (USB), IEEE 1394, or other communication links.

Computer system 1400 is coupled to a communication interface 1416 that provides a link (e.g., at a physical layer, data link layer,) between the system bus 1401 and an external communication link. The communication interface 1416 provides a network link 1418. The communication interface 1416 may represent a Ethernet or other network interface card (NIC), a wireless interface, modem, an optical interface, or other kind of input/output interface.

Network link 1418 provides data communication through one or more networks to other devices. Such devices include other computer systems that are part of a local area network (LAN) 1426. Furthermore, the network link 1418 provides a link, via an internet service provider (ISP) 1420, to the Internet 1422. In turn, the Internet 1422 may provide a link to other computing systems such as a remote server 1430 and/or a remote client 1431. Network link 1418 and such networks may transmit data using packet-switched, circuit-switched, or other data-transmission approaches.

In operation, the computer system 1400 may implement the functionality described herein as a result of the processor executing code. Such code may be read from or stored on a non-transitory computer-readable medium, such as memory 1410, ROM 1408, or storage device 1406. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 1418 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The appended claims are part of the teachings of this document and accordingly are incorporated by reference into this description.

The invention claimed is:

1. A system comprising one or more computers having circuitry forming one or more processors and memory storing computer program instructions for execution on the one or more processors to operate the system, the system comprising:

a plurality of source devices generating reporting data, the reporting data comprising a plurality of messages arriving over time, each message having one or more data fields;

a data collection system that receives the reporting data for delivery to a data sink;

an overload protection subsystem of the data collection system that provides overload protection for the data sink, said overload protection comprising:

(i) applying a policy for the data sink;
(ii) wherein the policy comprises:
a condition upon which a traffic shaping action is triggered;
a two-part definition of a class of reporting data, the two-part definition comprising a first part specifying a characteristic of messages in the reporting data upon which to select messages, and a second part specifying a criteria upon which to group messages having the characteristic specified in the first part; and,
each group of messages resulting from applying the two-part definition being considered a class of reporting data against which to evaluate the condition;
(iii) monitoring the class of reporting data defined in the policy to determine whether the condition in the policy has been met; and,
(iv) based on a determination that the condition has been met, applying the traffic shaping action to reporting data to create a data stream for the data sink;
the data collection system configured to send the data stream to the data sink.

2. The system of claim 1, wherein the traffic shaping action in the policy comprises thinning, and thinning comprises dropping one or more data fields in messages in the reporting data, the one or more data fields being defined in the policy.

3. The system of claim 2, wherein the data fields are independent of message format, the data fields appearing across a plurality of message formats being reported in the system.

4. The system of claim 3, wherein the plurality of message formats comprises any of: CSV, protobuf, JSON, Parquet, Flatbuffers.

5. The system of claim 1, wherein the traffic shaping action in the policy comprises throttling, and throttling comprises dropping one or more messages in the reporting data to achieve a data rate specified in the policy.

6. The system of claim 1, wherein the first part specifies reporting data originating from source devices in a particular geography.

7. The system of claim 1, wherein applying the traffic shaping action comprises sending a directive to a plurality of distributed data collection processes in the data collection system to perform the traffic shaping action.

8. The system of claim 7, wherein the plurality of distributed data collection processes are local to the source devices.

9. The system of claim 1, wherein said monitoring of the class of reporting data in (iii) comprises generating periodic measurements of the class of reporting data.

10. The system of claim 1, wherein said monitoring of the class of reporting data in (iii) comprises generating a set of models for reporting data volume.

11. The system of claim 1, wherein the plurality of source devices comprise a plurality of edge servers providing edge services to requesting clients and, in response thereto, generating the reporting data about those edge services.

12. The system of claim 1, wherein the plurality of source devices comprises any of: sensors, monitors, actuators, and cameras.

13. The system of claim 1, wherein the data sink comprises a computer system selected from the group of: reporting system, alerting system, visualization system, storage database, alarming system, network security intelligence system.

14. The system of claim 1, wherein the data collection system comprises a plurality of monitoring components that perform said monitoring in (iii) at least in part by generating summary data structures reflecting measurements of the reporting data, and aggregating said summary data structures in a hierarchical fashion from nodes in the data collection system to a controller that operates to determine when the condition has been met in (iv), and upon said determination, generates one or more rules to enforce the traffic shaping action, and initiates propagation of said rules back down the hierarchy in the data collection system.

15. A method performed by one or more computers, the method comprising:
receiving reporting data from a plurality of source devices, the reporting data comprising a plurality of messages arriving over time, each message having one or more data fields;
providing at least some of the reporting data from the source devices under the control of an overload protection component of a data collection system that protects a data sink from overload;
wherein the protection of the data sink by the overload protection component comprises:
(i) applying a policy for the data sink;
(ii) wherein the policy comprises:
a condition upon which a traffic shaping action is triggered;
a two-part definition of a class of reporting data, the two-part definition comprising a first part specifying a characteristic of messages in the reporting data upon which to select messages, and a second part specifying a criteria upon which to group messages having the characteristic specified in the first part; and,
each group of messages resulting from applying the two-part definition being considered a class of reporting data against which to evaluate the condition;
(iii) monitoring the class of reporting data defined in the policy to determine whether the condition in the policy has been met; and,
(iv) based on a determination that the condition has been met, applying the traffic shaping action to reporting data to create a data stream for the data sink;
sending the data stream to the data sink.

16. The method of claim 15, wherein the traffic shaping action in the policy comprises thinning, and thinning comprises dropping one or more data fields in messages in the reporting data, the one or more data fields being defined in the policy.

17. The method of claim 16, wherein the data fields are independent of message format, the data fields appearing across a plurality of message formats in the reporting data.

18. The method of claim 15, wherein the traffic shaping action in the policy comprises throttling, and throttling comprises dropping one or more messages in the reporting data to achieve a data rate specified in the policy.

19. The method of claim 15, wherein the first part specifies reporting data originating from source devices in a particular geography.

20. The method of claim 15, wherein applying the traffic shaping action comprises sending a directive to a plurality of distributed data collection processes in the data collection system to perform the traffic shaping action.

21. The method of claim 20, wherein the plurality of distributed data collection processes are local to the source devices.

22. The method of claim 15, wherein said monitoring of the class of reporting data in (iii) comprises generating periodic measurements of the class of reporting data.

23. The method of claim 15, wherein said monitoring of the class of reporting data in (iii) comprises generating a set of models for reporting data volume.

24. The method of claim 15, wherein the plurality of source devices comprise a plurality of edge servers providing edge services to requesting clients and, in response thereto, generating the reporting data about those edge services.

25. The method of claim 15, wherein the plurality of source devices comprises any of: sensors, monitors, actuators, and cameras.

26. The method of claim 15, wherein the data sink comprises a computer system selected from the group of: reporting system, alerting system, visualization system, storage database, alarming system, network security intelligence system.

27. The method of claim 15, wherein said monitoring in (iii) is performed at least in part by generating summary data structures reflecting measurements of the reporting data, and aggregating said summary data structures in a hierarchical fashion from nodes in a data collection system to a controller that operates to determine when the condition has been met in (iv), and upon said determination, generates one or more rules to enforce the traffic shaping action, and initiates propagation of said rules back down the hierarchy in the data collection system.

* * * * *